(12) United States Patent
Asciutto (10) Patent No.: US 9,848,593 B2
(45) Date of Patent: Dec. 26, 2017

(54) METHOD OF FUMIGATION OF BURROWING VERMIN TUNNELS

(71) Applicant: Joseph Asciutto, El Cajon, CA (US)

(72) Inventor: Joseph Asciutto, El Cajon, CA (US)

( * ) Notice: Subject to any disclaimer, the term of this patent is extended or adjusted under 35 U.S.C. 154(b) by 194 days.

(21) Appl. No.: 14/566,637

(22) Filed: Dec. 10, 2014

(65) Prior Publication Data

US 2015/0113855 A1    Apr. 30, 2015

Related U.S. Application Data

(63) Continuation-in-part of application No. 13/454,413, filed on Apr. 24, 2012, now Pat. No. 8,955,248.

(60) Provisional application No. 61/478,820, filed on Apr. 25, 2011, provisional application No. 61/914,295, filed on Dec. 10, 2013.

(51) Int. Cl.
*A01M 17/00* (2006.01)
*A01M 13/00* (2006.01)

(52) U.S. Cl.
CPC ........ *A01M 17/004* (2013.01); *A01M 13/006* (2013.01); *A01M 17/00* (2013.01); *A01M 17/002* (2013.01)

(58) Field of Classification Search
CPC .. A01M 13/00; A01M 13/006; A01M 17/004; A01M 17/00; A01M 29/00; A01M 29/12
USPC ................................. 43/124, 125, 127, 129
See application file for complete search history.

(56) References Cited

U.S. PATENT DOCUMENTS

| | | | | |
|---|---|---|---|---|
| 192,905 | A * | 7/1877 | Dreyer | A01M 1/2066 43/127 |
| 724,305 | A * | 3/1903 | Macfarland | A01M 1/2066 43/127 |
| 1,290,544 | A * | 1/1919 | Graumann | A01M 17/002 43/124 |
| 1,309,193 | A * | 7/1919 | Garrison | A01M 13/006 43/127 |
| 1,400,598 | A * | 12/1921 | Fowler | A01M 13/006 43/129 |
| 1,401,292 | A * | 12/1921 | Meter | A01M 13/003 43/124 |
| 1,419,653 | A * | 6/1922 | Meter | A01M 13/00 43/124 |
| 1,492,732 | A * | 5/1924 | Knopf | A01M 13/006 43/129 |
| 1,529,785 | A * | 3/1925 | Hammond | A01M 13/003 43/129 |
| 1,558,892 | A * | 10/1925 | Kennington | A01M 13/00 43/125 |

(Continued)

FOREIGN PATENT DOCUMENTS

| | | | | |
|---|---|---|---|---|
| CH | 637807 | A5 * | 8/1983 | .......... A01M 13/006 |
| GB | 1017820 | A * | 1/1966 | ............ A01M 13/00 |
| GB | 2213379 | A * | 8/1989 | ............ A01M 13/00 |

*Primary Examiner* — Darren W Ark
(74) *Attorney, Agent, or Firm* — Donn K. Harms (57) ABSTRACT

A method for the extermination of burrowing vermin is disclosed. The method employs a smoke generating fluid formed of castor oil or castor oil in a mix with secondary components. The fluid is heated to a smoking temperature and the smoke is mixed with a pressurized airflow to communicate the smoke to the tunnels occupied by the burrowing vermin to remove them, and to leave a residue from the smoke which exudes an order deterring the re-occupancy of the tunnels.

7 Claims, 5 Drawing Sheets

(56) References Cited

U.S. PATENT DOCUMENTS

| | | | | |
|---|---|---|---|---|
| 1,562,902 | A * | 11/1925 | Metzger | A01M 13/00 43/129 |
| 1,614,015 | A * | 1/1927 | Neuls | A01M 13/003 43/129 |
| RE16,841 | E * | 1/1928 | Bradner | F42B 12/50 43/129 |
| 1,775,703 | A * | 9/1930 | Stokes | A01N 25/00 43/129 |
| 1,872,676 | A * | 8/1932 | Castonguay | A01M 13/003 43/127 |
| 1,930,588 | A * | 10/1933 | Dibble | A01M 13/00 43/129 |
| 2,467,922 | A * | 4/1949 | Woytal | F16L 25/08 43/125 |
| 2,755,968 | A * | 7/1956 | Fiant | E04F 21/165 43/124 |
| 2,851,818 | A * | 9/1958 | Matheny | A01M 1/2088 43/129 |
| 2,906,056 | A * | 9/1959 | Youngblood | A01M 7/0092 43/124 |
| 3,017,121 | A * | 1/1962 | Carlson | A01D 43/14 239/129 |
| 3,239,960 | A * | 3/1966 | Stevens | A01M 13/00 43/129 |
| 3,242,098 | A * | 3/1966 | Andrews | A01G 13/065 43/129 |
| 3,249,553 | A * | 5/1966 | Steinberg | F41H 9/06 43/127 |
| 3,382,603 | A * | 5/1968 | Oberto | A01M 13/00 43/129 |
| 3,900,983 | A * | 8/1975 | Petrosky | A01M 23/02 43/58 |
| 3,982,351 | A * | 9/1976 | Waldron | A01M 13/00 43/129 |
| 3,986,670 | A * | 10/1976 | Syveson | B05B 1/24 43/129 |
| 4,026,330 | A * | 5/1977 | Dunn | A01M 13/006 43/124 |
| 4,173,094 | A * | 11/1979 | Nichols, Jr. | A01M 21/043 43/129 |
| 4,240,802 | A * | 12/1980 | Nichols, Jr. | C10L 1/14 43/129 |
| 4,823,505 | A * | 4/1989 | Jackson | A01M 1/245 43/124 |
| 4,829,706 | A * | 5/1989 | Perry | A01M 13/006 43/127 |
| 4,906,032 | A * | 3/1990 | Hohman | F16L 37/025 285/148.23 |
| 5,058,312 | A * | 10/1991 | Jackson | A01M 1/245 43/124 |
| 5,109,628 | A * | 5/1992 | Ellefson | A01M 17/004 43/129 |
| 5,109,629 | A * | 5/1992 | King, Jr. | A01M 17/002 43/124 |
| 5,154,018 | A * | 10/1992 | Livingston | A01M 17/002 43/125 |
| 5,282,334 | A * | 2/1994 | Kimura | A01M 1/2072 43/129 |
| 5,548,921 | A * | 8/1996 | Kleisath | A01M 13/006 43/124 |
| 5,588,252 | A * | 12/1996 | Jones | A01M 17/004 43/129 |
| 5,700,039 | A * | 12/1997 | Manning | A01M 13/006 43/125 |
| 6,026,609 | A * | 2/2000 | Rawls | A01M 1/2094 43/124 |
| 6,139,857 | A * | 10/2000 | Gaddini | A01N 59/02 424/405 |
| 6,279,261 | B1 * | 8/2001 | Binker | A01M 17/008 43/125 |
| 6,923,977 | B1 * | 8/2005 | Boyce | A01N 65/00 424/405 |
| 7,235,254 | B1 * | 6/2007 | Speed | A01N 25/34 424/405 |
| 7,249,437 | B2 * | 7/2007 | Stout | A01M 7/0014 43/124 |
| 7,581,349 | B2 * | 9/2009 | Hurlburt | A01M 17/004 43/124 |
| 7,617,630 | B2 * | 11/2009 | Holmes | A01M 13/006 43/124 |
| 8,800,200 | B1 * | 8/2014 | Williams | A01M 17/004 43/127 |
| 8,955,248 | B2 * | 2/2015 | Asciutto | A01M 13/006 43/127 |
| 9,414,603 | B2 * | 8/2016 | Messina | A01N 25/00 |
| 2008/0178518 | A1 * | 7/2008 | Reece | A01M 1/2066 43/127 |
| 2009/0313882 | A1 * | 12/2009 | Hurlburt | A01M 13/006 43/125 |
| 2010/0104666 | A1 * | 4/2010 | Cox | A01N 65/00 424/705 |
| 2011/0008264 | A1 * | 1/2011 | Negishi | A01M 13/006 43/1 |
| 2011/0197495 | A1 * | 8/2011 | Shaw | A01M 13/006 43/125 |
| 2011/0277373 | A1 * | 11/2011 | Robbins | A01M 17/004 43/125 |
| 2013/0019813 | A1 * | 1/2013 | Rubin | A01G 31/001 119/712 |
| 2013/0091757 | A1 * | 4/2013 | Victorio da Costa | A01M 13/00 43/125 |
| 2013/0156839 | A1 * | 6/2013 | Messina | A01N 37/06 43/131 |
| 2016/0338336 | A1 * | 11/2016 | Aylett | A01M 13/006 |

* cited by examiner

METHOD OF FUMIGATION OF BURROWING VERMIN TUNNELS

This application is a continuation in part application to U.S. patent application Ser. No. 13/454,413 filed on Apr. 12, 2012 and which claims priority to U.S. Provisional Patent Application No. 61/478,820 filed on Apr. 25, 2011, and also claims priority to U.S. Provisional Patent Application Ser. No. 61/914,295 filed on Dec. 10, 2013 all of which are incorporated herein in their respective entirety by this reference thereto.

BACKGROUND OF THE INVENTION

1. Field of the Invention

The present invention relates to burrowing vermin pests which dig and occupy underground tunnels. More particularly it relates to a method of fumigation using heated gas and oils, which not only exterminates the current occupants of such tunnels, the method renders the tunnels uninhabitable by other subsequent burrowing rodents and mammals who may attempt occupancy. Such is accomplished by employing generating smoke which imparts a long lasting scent which experimentation has shown such animals will avoid.

2. Prior Art

There are many types of burrowing pests which dig and occupy tunnels and burrows. While decades in the past, such animals often had their populations naturally controlled by predators such as coyotes, foxes, and the like, modernly such underground pests have adapted to live and burrow in areas where few such predators exist.

Living free of substantial risk from predators in fields and back yards, there has been a resulting explosion in the population of burrowing animals, and the problems associated with them. Gophers are well known burrowing pests and are similar to most such animals. The term gopher as it is commonly used does not relate to any one species, but is a generic term used to describe any of several small burrowing rodents endemic to North America, including the pocket gopher (family Geomyidae), also called true gophers, and the ground squirrel, including Richardson's ground squirrel and the species of prairie dog.

Gophers in this group of burrowing animals can vary in size and often weigh around 0.5 pounds (230 g), and are about 15 inches (38 cm) long in body length, with a tail 7 inches (18 cm) long. They are well adapted to living underground in tunnels.

Consequently, gophers and similar burrowing vermin dig tunnels and subterranean chambers, and are associated with the rodent order. With their constant burrowing and eating of decorative and food crops, the over one hundred kinds of gophers in America continually disrupt human endeavors such as commercial agriculture, garden plots, landscaping, and even underground communication cables. The penchant of such burrowing creatures for digging and chewing, and their exploding population caused by lack of predators, has led to their treatment as unwanted pests who cause significant financial and ecological harm.

Gophers and similar burrowing creatures create a large community of tunnels with large mounds of dirt and rocks at their entrances, sometimes referred to as gopher towns. In some species, burrowing rodents will frequently position one or more members of the troop to stand watch at the entrance to a tunnel who will whistle when predators are spotted. This signal causes the other gophers to run for the safety of the tunnels making it hard for predators unused to this behavior to thin the herd. As such gophers and other rodents breed rapidly, in a short span of time a gopher town can easily spread to take over large sections of yards, gardens, and meadows, and may have a population from dozens to hundreds depending on the territory and food supply. The resulting destruction of plant life caused by large and small groups of such vermin leave the area a stretch of denuded dirt.

As a consequence of the exploding populations, many exterminating techniques for burrowing vermin such as gophers have evolved. Many modern techniques involve the application of poisonous chemicals, smoke, or gasses being introduced into the burrow in efforts to kill the inhabitants. U.S. Pat. No. 5,548,921 to Kleisath teaches a method and apparatus for gassing gophers, comprising a device for introducing dry chlorine material and water into a burrow. The combination of dry chlorine and water produces chlorine gas for effective poisoning of the gopher. However, for the average consumer, the use and handling of poisonous materials may not be desirable, especially if they have children. Further, the employment of such chemicals often leaves residual toxins in the soil long after use and which can be toxic to humans.

U.S. Pat. No. 7,249,437 to Stout teaches a method and apparatus for exterminating burrowing pests where a first agent is introduced into the burrow to destabilize the pest, followed by a second agent for killing them. The method taught in Stout effectively administers a lethal dose of poison before the animal can escape or hide within the burrow. Although providing a means to exterminate burrowing pests, the method and apparatus taught by Stout does not seem economically viable for the average consumer.

U.S. Pat. No. 4,829,706 to Perry teaches an apparatus for introducing the poisonous exhaust gasses of a two cycle engine into a burrow. The device includes a bowl shaped exhaust shroud for placing over a burrow entrance and directing the exhaust gasses. However, the smoke produced and level of toxicity of the exhaust gasses is limited to what the internal engine can burn, and lacks any ability to combine the delivered gas with another agent. Neither does the Perry reference provide and residual deterrence to re-occupancy of the deserted tunnels and as such is not suitable for reliable and long term extermination.

As such there is a continuing and unmet need for an improved device for directing communicating gasses under pressure into the long tunnels of a burrow. In order to provide a long term deterrent to immediate re-occupation by other rodents, such a communicable gas should render the tunnels uninhabitable. Such a long term deterrence to habitation by other rodents should be in a form which is harmless to humans, but avoided by gophers and other rodents for a term to allow the tunnels to collapse.

Still further, in order to eliminate the need to purchase specialized equipment, such a method should be employable with multiple means for delivering a pressurized gas stream to tunnels and in on mode should be employable with a device which is easily engageable to a conventional internal combustion engine through a communication with the exhaust pipe, stand-alone small engine or employing in combination with a car, or motorcycle, or other wheeled vehicle having an internal combustion engine. Such a method should be easily employable with a device for heating the fluid providing the extermination and long term deterrence, using a portable and easily positionable for communication of heated gas to burrow entry points.

SUMMARY OF THE INVENTION

The system herein disclosed and described provides a method for tunnel fumigation which provides the solution to the shortcomings in prior art. It achieves such goals through the provision of a liquid fuel which when heated, propagates a smoke which will exterminate the vermin such as gophers occupying a tunnel system or drive them from the tunnels above ground. Further, the smoke generated from the fuel herein imparts a residue on and in the soil of tunnel wall, through contact of the smoke with the surface of the tunnel walls. This residue imparts a scent to the tunnels which remains for months, depending on the depth of the tunnel.

The smoke generating fuel is in liquid form and has a flash point below 700 degrees F. such that it will evaporate from liquid to smoke at temperatures below and approaching that temperature threshold. Such may be communicated to the liquid from a heating element and communicated to the tunnels using a fan, or in a particularly preferred mode, the heat necessary to generate smoke from the liquid, can be provided by engagement to the engine exhaust port of an internal combustion engine use exhaust gasses to generate smoke from the liquid which are mixed and forced into the tunnels by the pressurized exhaust stream from the engine.

This imparting of the scent to the tunnel walls and soil from the smoke generated from the liquid herein, provides a residual means for deterring occupation or habitation of the tunnel system after the original rodent residents have been exterminated or removed. It is this residual deterrence of reoccupation by other subsequent rodents, which yields a significant improvement over simple exhaust or smoke employed in all prior art.

In the favored mode of the method herein, castor oil alone, or castor oil in mixed combinations with other oils provides the smoke generating liquid imparting the scent residue to tunnel walls and soils. Experimentation with vegetable and other oils along with Castor oil has shown that Castor oil either alone or in mixtures is most preferred because it leaves the residue emitting deterring odors. In addition Castor oil has other unique properties in that it has a flash point of only 445 degrees F. (229 deg C.), so it will begin emitting smoke when heated to this temperature. However, castor oil has a fire point is about 840 degrees F. (449 deg C.) which is generally above the temperature of exhaust gasses from internal combustion engines which are in the 700 degree F. range, so it does not catch on fire when heated with exhaust. When used in a combination with another oil such as mineral oil, or safflower oil, it raises the flash point of the mixture which when used in combination with exhaust gas, is desirable lest the mineral or vegetable oil alone catch fire.

This fluid whether solely castor oil, or a homogeneous mixture of castor oil and another oil such as mineral oil or safflower oil, may be heated in a container or chamber to the temperature level, where smoke rises from the surface of the liquid mixture supply. Using a bellows, fan, or other means for directional air movement, the developed smoke is communicated through a conduit, and into communication with the internal area and surfaces of the tunnels or burrows. As noted use of internal combustion engine exhaust gases to heat and mix with the smoke from the liquid mixture is especially preferred as the pressure of the exhaust gas can be employed to pump the smoke and exhaust through the tunnels and burrows.

Heat for raising the temperature of the castor oil, or castor oil combinations with other oil in the smoke emitting liquid mixture, may also be provided by direct flame or by electrical resistance components, or as noted by heating with exhaust gas such as from an internal combustion engine. The smoke communicated to and fumigating the tunnels will then either drive the burrowing rodents such as gophers therefrom, or exterminate them in the tunnels due to smoke inhalation.

However, key to the residual deterrence provided by the method herein, is the employment of smoke generating liquid or fuel for the communicated smoke which is entirely, or substantially formed by castor oil due to the above noted flash and ignition temperatures and the generated residue with the rodent-deterring scent. It is the oily smoke from the castor oil component in the fuel providing the smoke which imparts this scent to the surfaces and soil of the tunnels. Experimentation with other oils and castor oil and castor oil mixes has shown that burrowing rodents such as gophers dislike the residual scent subsequent to fumigation with all or some castor oil so intensely, that escaped occupants of the tunnels do not return. Thus the castor oil generated scent has shown to be a significant deterrence to the reoccupation of the tunnel system by other rodents or gophers for months subsequent to the fumigation with the castor oil generated smoke.

Currently, a mixture of pure castor oil, or castor oil between 40 to 100 percent of the smoke generating mixture with other oils used for developing the tunnel exterminating smoke. In particular, a mixture of castor oil in a range of 40 to 100 percent of a total volume of the smoke generating mixture which also includes 10-60% mineral oil by volume, has shown to develop a toxic smoke, which also provides a significant enhancement of the long term deterrence of a reoccupation of the tunnel system subsequent to the extermination of the occupying vermin population.

Alternatively is has been found that mixture of castor oil in a range of 40 to 100 percent of a total volume of the smoke generating liquid mixture which also includes 10-60% safflower oil by volume, also generates a smoke which will dispatch the rodent occupants of a tunnel system, and, impart a residue from the smoke with the deterrent odor attributed to the castor oil component of the mixture. Experimentation with differing oils has shown that mixtures lacking the castor oil component or sufficient castor oil in the mix, lacks the residual deterrence of a scent to the tunnels fumigated.

Additional residual deterrence and enhanced initial removal of rodents from fumigated tunnels has been found by adding *Oleoresin Capsicum* or capsaicinoids (the ingredient of pepper spray) to the mixture. Experimentation has shown the inclusion of capsaicinoids at a rate of from 0.18% to 1.33% of the total volume of the smoke generating liquid mixture provides a significant initial enhancement to removing pests from the tunnels fumigated, and, enhanced long term deterrence from reoccupation.

Consequently a mixture of pure castor oil for extermination and subsequent residual deterrence, or, castor oil combination with secondary ingredients from a group including mineral oil, safflower oil, and capsaicinoids, in the noted percentages of the total volume of smoke generating liquid mixture to increase the length of deterrence, are preferred.

Mixtures of castor oil in similar and differing percentages with motor oil, cooking oil, and other plant and fossil fuel oils have been employed and yielded a significant improvement in long term deterrence of occupation of the treated tunnels. However the long term deterrence has been shown to be slightly less than pure castor oil, or the above noted preferred castor oil and mineral oil mix, or safflower oil, mix. However, other mixtures of castor oil with cooking and/or motor oils and/or animal oils such as whale or fish oil, or jojoba oil, can be considered significant improvements over the prior art through the provision of such long term deterrence and within the scope of the claims of this application.

While experimentation to date has shown that a castor oil and mineral oil mix yields the most significant long term deterrence to reoccupation of tunnels, those mixtures of plant, mineral, or animal based oils with castor oil to generate smoke to exterminate tunnel occupying rodents and pests, as would occur to those skilled in the art once educated by this patent, are all considered within the scope of this patent since such residual deterrence of reoccupation of vermin tunnels, which is harmless to humans, has yet to be disclosed or claimed in the prior art.

Employed in a reservoir container to which appropriate heat is communicated to generate the smoke from the oil mixture herein, the castor oil bearing smoke, is projected through a conduit engaged with the tunneling system by air pressure such as a fan or compressor, or for instance by the herein noted pressurized gas from an exhaust pipe of an internal combustion engine.

Using such exhaust gasses has the additional enhancing effect of removing most of the oxygen from the air communicated to the smoking fuel mixture which prevents ignition of the mixture, and enhances the smoke generated. Further, combined with the toxic and heated gasses of engine exhaust, the communicated gaseous mixture to the tunnels is of elevated toxicity to more quickly cause the death of vermin breathing the mixture.

In all modes of the system herein, castor oil is the prime ingredient to yield the enhanced utility in the extermination system of residual deterrence to reoccupation of the tunnels. The toxic gas mixture, especially at elevated toxicity as provided via oil or other fluid or gassifable solids introduced into the plenum chamber, effectively asphyxiates and/or exterminates the pest within the burrow. The castor oil element in this gaseous mixture imparts a residual and long lasting deterrence to reoccupation by other rodents which is a severe problem with current systems for exterminating burrowing rodents. Months have passed and during experimentation with the castor bean oil system herein, by inspecting fumigated tunnels, reoccupation was prevented or significantly decreased over current systems where in many cases, new rodents occupy the fulminated tunnels within days.

In a particularly preferred mode of the method of using the castor oil generating smoke mixture herein, heat to cause smoke from the liquid is provided by exhaust gas from an internal combustion engine. The reservoir containing the liquid mixture generating the smoke in the method herein, may be operatively engaged to be heated with exhaust by communication thereof form the terminating end of the exhaust pipe of an existing internal combustion engine such as on a car or piece of equipment, providing there is sufficient heat in the exhausting gasses at the exhaust pipe terminating end.

Such engines are conventionally found on vehicles such as, but not limited to, passenger vehicles, tractors, lawn mowers, generators, motorcycles, and similar vehicles. In another particularly preferred mode, the device is engageable to an engine exhaust pipe at the terminating tail pipe end via a means for engagement such as a plug-in or slide-on type engagement. This allows the device to be easily retrofit to an available exhaust pipe of an available internal combustion engine by the user without the need for permanently altering existing vehicle engine and exhaust components. Such employment is preferably made employable on engines where there is sufficient heat in the exhaust gas exiting the exhaust port to vaporize or burn oil in the device's plenum chamber.

In yet another particularly preferred mode, the reservoir for the liquid mixture for generating smoke, may use communicated heat from an intermediate position along an exhaust pipe between the engine head and the distal end of the tail pipe. This position is desirable since exhaust gasses are normally hotter before passing completely through a the tail pipe. This mode of heat generation would employ a switch interface, such as a three-way valve, to operatively re-direct the heated exhaust to the intake pipe of the housing holding the reservoir of liquid smoke generating mixture from the conventional route toward the tailpipe.

In all the particularly preferred modes of the method herein, to generate the heat to cause the liquid mixture to smoke, a reservoir holding the liquid mixture can be operatively engaged to an internal combustion engine by some means of substantially sealed engagement to an exhaust gas output. In this fashion, the smoke generating heat is derived from waste heat and exhaust existing engines, and the pressure of the exhaust mixed with the generated smoke can be employed to communicate the smoke and exhaust gasses to the intended burrow.

In a preferred mode of a heating device to hold the smoke generating liquid mix and heat it to smoke, such a device is in operative communication with exiting exhaust gasses from an engine communicated under engine-generated pressure, into the axial conduit of an intake pipe which communicates with a plenum chamber having a reservoir for the smoke generating liquid mixture. The plenum chamber provides a means to concentrate the exhaust smoke, and provides the heat sufficient to generate smoke from the liquid mixture herein in combination with exhaust gas heat.

Furthermore, a fill portion or aperture of the plenum chamber can be included as a means to introduce additional liquid to generate smoke or fumes in combination with exhaust gasses, such as oil, into the plenum chamber.

The moving exhaust gasses through the plenum chamber and the smoke generated from the liquid mixture will exit the plenum chamber as a highly concentrated toxic exhaust and smoke mixture. For instance, a user may continually introduce the liquid mixture of Castor oil or other mixes which will smoke and turn gaseous when exposed to exhaust heat into the plenum chamber as needed, to provide a specific toxicity of the mixture and is advantageous over prior art devices of this nature.

The toxic smoke mixture exits the plenum chamber and is communicated under pressure from the incoming exhaust from the internal combustion engine, through the exhaust conduit of the device exiting the plenum chamber, to an exhaust hose or tube in a sealed engagement therewith.

The exhaust hose or tube is employed to communicate the gas and smoke mixture, between the exit port of the exhaust conduit of the plenum chamber device, and an entrance hole of an underground burrow. As long as the internal combustion engine is running and supplying and pressurizing the gas supplied to heat the liquid mixture herein to a smoking temperature, the exhaust gasses exiting the device under that pressure, are pumped into the burrow upon successive cycles of the engine. This allows communication of the exhaust gasses and smoke mixed therein, such that they saturate the air supply at the far reaches of the burrow and any adjoined tunnels.

It is additionally particularly preferred that the exhaust hose carrying the mixture of exhaust and smoke, include a means for sealing the hose with a burrow entrance such as a stopper plate engaged at or near the distal terminating end of the hose. In use, the distal end of the hose is inserted into the burrow entrance while the stopper plate provides a means to limit the amount of hose that can be introduced into the burrow, i.e. only the remaining distal portion of the hose from the stopper plate to the terminating end is introduced into the burrow.

The distal end of the hose is preferably a rigid member such that the distal end does not pinch or bind within the burrow entrance. The stopper plate additionally provides a seal around the burrow entrance upon inserting the distal portion and the user may pack dirt or other debris over the top surface and perimeter of the stopper plate to further seal the entrance. As noted above, the employment of dry ice to generate highly concentrated carbon dioxide is employable herewith, and because such melts to a gas at lower temperatures than liquids such as oil, a supply of dry ice may be positionable closer to the engagement to the burrow. An aperture to insert the dry ice in the hose in contact with the gas supply would provide a means to include such in the exhaust gas communicated to the burrow without having to deposit it in the plenum chamber.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide a burrowing vermin extermination method which is easy to use, cost effective, long lasting, durable and leaves no residual toxicity within the environment.

It is an object of the invention to provide a burrowing vermin extermination method which may heat a smoke generating liquid using an engagement to an existing internal combustion engine so as to eliminate the need to purchase smoke and heat generation equipment.

It is an object of the invention to provide a burrowing vermin extermination device which provides a heated passage as a means to introduce oil or other toxic smoke producing substances into fluid flow of heated exhaust flowing through the system.

It is still another object of the invention to provide a means to form a sealed communication between the flow of gas from the device, and the entrance to the burrow and underlying tunnels system to aid in flowing the gas through the system.

It is an object of the invention to provide a burrowing vermin extermination system which leaves a residual deterrence to re-habitation upon the surfaces of the fulminated tunnels which is harmless to humans.

DETAILED DESCRIPTION OF THE PREFERRED EMBODIMENTS OF THE INVENTION

Figure 1:
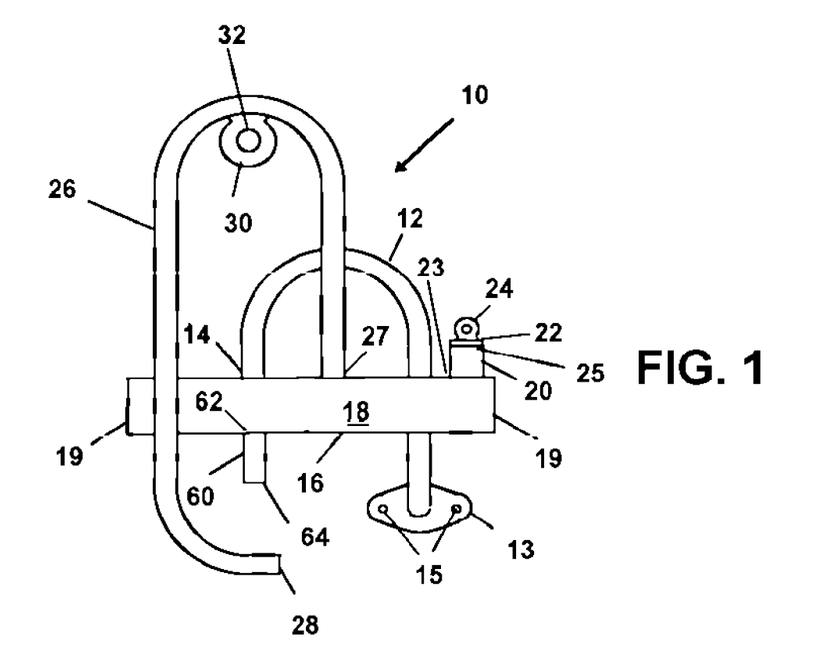
FIG. 1 shows front view of the device.
Figure 2:
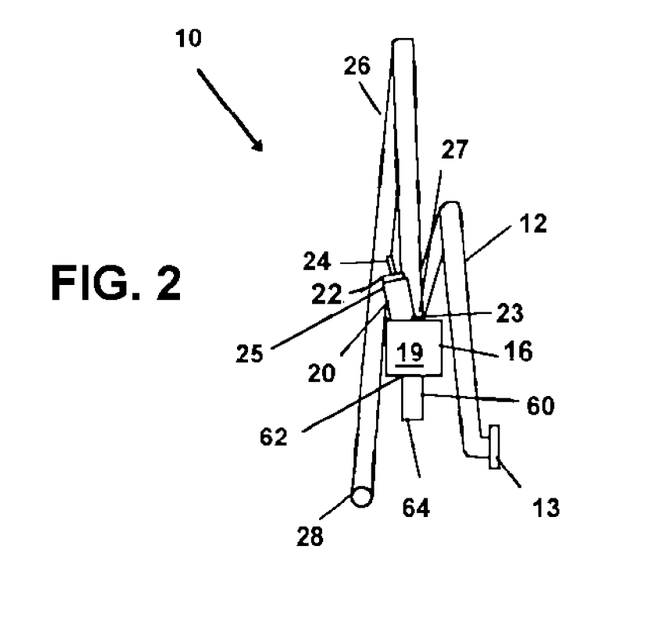
FIG. 2 is a side view of the device.

Now referring to drawings in FIGS. 1-13, wherein similar components are identified by like reference numerals, there is seen in FIG. 1 and FIG. 2 front and side views of the burrowing vermin extermination device 10 herein. The device 10 includes an intake aperture communicating with an axial conduit for receiving pressurized exhaust from an engine such as the depicted intake pipe 12. The intake pipe 12 is best formed of metal such as steel to maintain heat internally in its axial cavity, or of similar heat retaining and resistant material. The axial cavity of the intake pipe 12 communicates from the first end having a flange 13 for engagement to an engine exhaust port to a sealed communication of the axial cavity at a second end 14 with the internal cavity within the surrounding walls forming the plenum chamber 16.

In the mode of FIG. 1-2, the first end flange 13 provides a means for sealed engagement to an engine exhaust port, such as the depicted plate with one or a plurality of apertures 15 for operative bolt-type engagement to an engine exhaust port as is known commonly in the art. This engagement provides a sealed intake means to receive the exhaust gases from the internal combustion engine.

The second end 14 of the intake pipe 12 preferably extends generally in an inverted U-shaped fashion to allow extra length of the pipe and axial conduit therein, without enlarging the overall length and girth of the device 10. This U-shape above the upper surface of the plenum chamber also provides a means to prevent liquid or other material deposited in the plenum chamber 16 from being communicated back toward the engine.

The second end 14 terminates at a sealed engagement of the axial conduit of the intake pipe 12, with the plenum chamber 16 by a means of engagement such as welding or bolt-type. Sealed engagement of the intake pipe 12 to the plenum chamber 16 allows exhaust gasses to pass through the axial cavity of the intake pipe 12 and directly into the plenum chamber 16 without leaking.

The plenum chamber 16 is an enclosed chamber defined by one or a plurality of side walls 18 extending between capped ends 19. In use the plenum chamber 16 provides a means to concentrate exhaust gasses, and to enhance them, for communication and use as a toxic substance for exterminating and/or asphyxiating vermin.

The plenum chamber 16 is equipped with a filler access 20 including a removably engaged filler access cap 22. The filler access 20 is formed as a tube and extends from a first end 23 to a second end 25 where the access cap 22 engages. The first end 23 in sealed engagement to the plenum chamber 16 providing a conduit for communication into the enclosure of the plenum chamber 16 from the second end 25, to allow a user to introduce oil, liquid, gassifable solids such as dry ice, or other toxic substances into the chamber 16 for combination with the entering exhaust gas.

Briefly stated, the hot exhaust gasses entering the plenum chamber 16 heat the oil or other gassifable substance introduced into the chamber 16 to a gaseous state producing an enhanced toxic gaseous mixture. The operative means of employment of the device 10 for vermin removal and related features will become apparent upon further disclosure of at least one particularly preferred as used mode set forth shortly in FIGS. 3,9 and 10.

Additionally engaged to the plenum chamber 16 is the sump pipe 60 having an internal cavity including a first end 62 and a second end 64. The first end 62 of the sump pipe 60 engages the plenum chamber to place its internal cavity in sealed engagement to the plenum chamber 16 preferably inline with the second end 14 of the intake pipe 12. The second end 64 is capped defining an enclosed internal cavity of the sump pipe 60.

During operative employment of the device 10 the internal cavity of the sump pipe 60, aligned with the intake pipe 12, provides a low spot or "sump" directly under the incoming hot exhaust gas exiting the intake pipe 12 under pressure into the plenum chamber 16. This incoming gas heats the plenum chamber 16 and sump pipe 60 and communicates hot gasses directly into the axial internal cavity of the sump pipe 60.

The heated plenum chamber 16 and hot walls thereof, causes the oil or other substance communicated into the plenum chamber 16 to heat faster and to make smoke almost immediately. The fluid or heat induced smoke producing substance communicated into the internal cavity of the sump pipe 60 is also heated by its wall surface and especially from the direct contact of the entering hot exhaust gas from the intake.

The sump pipe 60 internal cavity serves as a reservoir to attract by gravity, and hold the liquid or other heat induced smoke producing material deposited to the plenum chamber 16 which does not boil or turn to smoke immediately upon entry. The reservoir also holds fluid or material not immediately turned to smoke or gas to allow such a conversion over time.

As noted, it is preferred that the cavity within the pipe forming the sump 60 should be lower than the plenum chamber 16 with the device 10 upright as in FIG. 1, to provide a gravity induced means to collect any excess fluid therein for a timed cooking to smoke. However, the sump 60 may be formed of alternative construction and/or location while still providing reasonably improved utility as outlined above and should not be considered limiting by the figure.

The device 10 further includes an exhaust pipe 26 having an axial passage communicating between a first end 27 and a second end 28. The first end 27 is in sealed engagement of the axial cavity with the plenum chamber 16 by a means of sealed engagement in a manner to allow fluid (smoke) to pass from the chamber 16 and to the axial cavity of the exhaust pipe 26 when in use. The means of sealed engagement of the first end 27 of the exhaust pipe 26 to the chamber 16 may be welding, bolt type, or the like. The exhaust pipe 26 preferably extends generally in an inverted U-shaped fashion above the upper surface of the plenum chamber with the device 10 in the as-used position of FIG. 1, from the first end 27 to the second end 28 which purpose will become apparent shortly.

Figures 3, 4, 5:
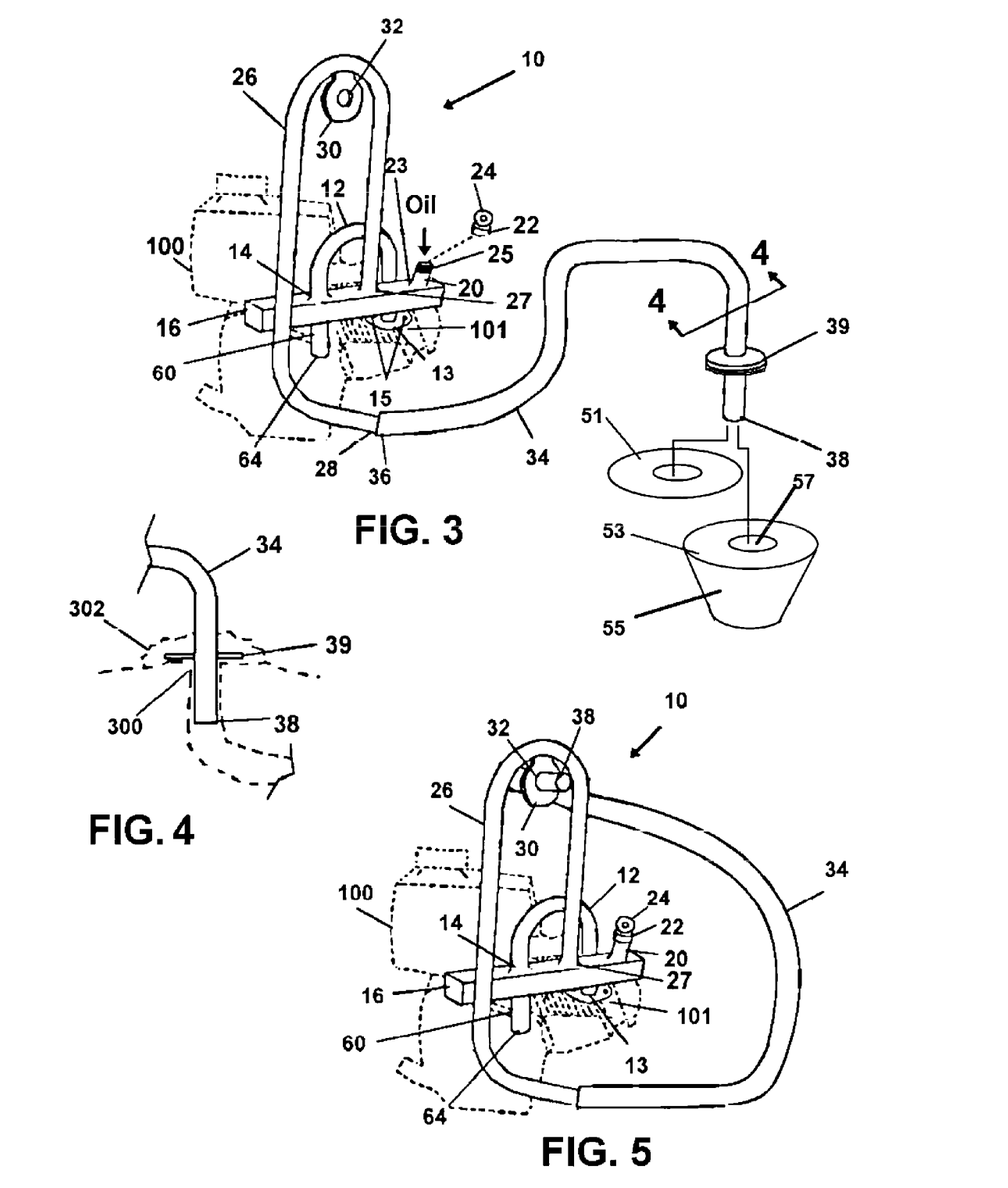
FIG. 3 is an elevated view in a particularly preferred as used mode engaged to an stand alone small engine.
FIG. 4 is a cross sectional view of the distal end of the exhaust hose engaged within the entrance of a burrow.
FIG. 5 is an elevated view of the device with the exhaust hose in a stored position.

FIG. 3 shows an elevated view of the device 10 in a particularly preferred as-used mode as in FIG. 1. In this mode the device 10 is also configured to function as an engine 100 muffler. The flange 13 or other means of sealed engagement at the first end of the intake pipe 12 is operatively engaged to the exhaust port 101 of the engine 100. The means of engagement may be bolt type engagement via the holes 15 of the first end flange 13 as is commonly known in the art.

In use, as the engine 100 is started and while running, it produces hot exhaust gasses. The gasses are directed via the axial conduit of the intake pipe 12 into the plenum chamber 16 and directed toward the sump pipe 60. The introduction of hot gasses into the plenum chamber 16 of the device 10 provides a means to heat oil, liquid, or solids which turn to gas or smoke when exposed to heat, or similar smoke producing substance which has been introduced into the plenum chamber 16 via the filler access 20.

In use, the filler access cap 22 is temporarily removed to allow combination to the enclosure of the plenum chamber 16. The user will simply add the desired amount of oil, liquid, or solids into the chamber 16. Additionally, the user is permitted to continually add more heat induced gas producing substances as needed, or while the engine is running.

As the typically hot gasses of the engine exhaust enter the plenum chamber 16 and are directed toward the cavity in the sump 60, the added oil or heat activated substance is heated and cooked or boiled and gasified, and toxic smoke is produced for combination with the exhaust gas. The engine 100 fuel may be gasoline, diesel, propane, vegetable oil, or fuel burning type of the like that produces exhaust gasses of a temperature to effectively heat oil or similar smoke producing substance to a gaseous state. There is seen a great advantage over prior art in that the disclosed invention can burn clean, non ground polluting vegetable oil, and therefore is more suitable for use in environmentally sensitive areas.

It is an advantage of the present invention to allow a user to continuously add oil or other heat induced smoke producing substances into the plenum chamber 16 via the filler access 20 as needed for effective vermin extermination. Furthermore the elevated position of the inverted U-shaped intake pipe 12 provides a means to prevent any liquid oil or similar liquid substance from entering and possibly damaging the engine such as from over-filling of oil into the plenum chamber 16 or accidental tipping of the device 10.

During operation the intake pipe 12, plenum chamber 16, and filler access 20 will heat to a temperature determined by the spent hot exhaust gasses expelled from the engine 100. As such it is preferred in the device herein, to provide a means to disperse heat from the filler access cap 22 to allow a user to grasp the cap 22 during operation. This may be a heat sink 24 such as a substantially planar protrusion 24 engaged to the cap 22 or similar heat sink means known in the art. The means of engagement of the filler access cap 22 to the filler access 20 may be thread type on the second end 25 or any other means for sealed removable engagement known in the art.

Once the desired toxicity of smoke is obtained, the exhaust smoke communicates from the plenum chamber 16 to the axial passage of the exhaust pipe 26. The depicted elongated extension of the exhaust pipe 26 provides a means to cool the exhaust gasses due to the added exposure of the exhaust pipe 26 to the ambient environment, similar to a heat sink. In that manner, heat will dissipate from the exhaust gasses to the exhaust pipe, and ultimately into the ambient air. The lowered temperature of the gas mixture achieved provides for safer handling and employment of the device 10 by a user.

However, it must be noted that a conventional heat shield (not shown) may additionally be employed as needed for safety reasons. Furthermore, the inverted U-shaped extension of the exhaust pipe 26 is preferred as a means to prevent unburnt oil or material deposited into the plenum chamber from passing from the chamber 16 through the exhaust pipe 26 and ultimately to the environment.

It is additionally preferred that in all particularly preferred modes of the device 10 disclosed that there is further included an exhaust hose 34 or tube. The exhaust hose 34 includes an axial passage communicating from a first end 36 to a second end 38. There is additionally included a substantially planar hose-surrounding stopper plate 39 circumferentially engaged about the hose 34 at or near the second end 38. The first end 36 is generally engaged to the terminating second end 28 of the exhaust pipe 26 by a means of removable engagement. The exhaust hose 34 is preferably flexible, wear resistant, and heat resistant material as to allow the user to position the hose 34 as needed to a burrow entrance.

However, the second end 38 and stopper plate 39 are preferably metal such as steel as to ensure no pinching or binding of the distal end of the hose once inserted into a burrow. In this fashion the second end 38 and stopper 39 may be a metal fitting which is engaged to the end of the flexible hose 34.

The stopper plate 39 provides a means to seal the burrow entrance 300 when engaging the distal end 38 therein, as shown in cross sectional depiction in FIG. 4. The stopper plate 39 also provides a means to limit the distance the exhaust hose 34 can enter a burrow 300 to prevent it from getting stuck, while providing a seated sealed engagement with the entrance 300. Furthermore, added utility is found in that a user may pack dirt 302 or other debris over the rear of the stopper plate 39 to form an additional seal of the entrance 300.

The sealing component for the distal end 38 of the hose can also include a kit of sealing components to mate with and enhance the sealed engagement of the distal to the burrow entrance 300. Further, such a kit of components can provide mating components to allow lengths of hose to be added as needed to extend the exhaust hose 34 to hard to reach places. As shown, an enlarged diameter secondary plate 51 and cicumfrential tapering interface 53 provide enhanced means for initial engagement and sealed engagement with the entrance 300. The secondary plate 51 would be of a diameter 2-3 times larger than the diameter of the stopper plate 39 and have an aperture therein sized smaller than the diameter of the stopper plate 39. This allows the stopper plate 39 to seat on the upper surface of the secondary plate 51 and lets the device seal with larger burrow holes.

The tapering interface 53 provides a tapered sidewall 55 for engagement in a projection into the burrow entrance 300 and a planar top surface configured for sealed engagement against the stopper plate 39. The axial passage 57 through the tapering interface 53 communicates the gas into the burrow. The device 10 may include the secondary plate 51 and tapered interface 53 and stopper plate 39 in a kit of sealing components so the user may chose the component yielding the best seal to the particular burrow entrance 300.

As seen in FIG. 5 the device 10 includes a hose storage portion 30 with an aperture 32 engaged to the exhaust pipe 26. The storage portion 30 is preferable provided at an elevated position relative the terminating second end 28 of the exhaust pipe 26. In this manner the distal second end 38 of the hose 34 can be secured similarly elevated to provide an additional means to ensure no unburnt oil reaches the environment in case of accidental tipping or the like. Further, it is noted that the user can essentially engaged or rest the distal end 38 at any elevated position, for example a car tailgate that happens to be close by.

Figure 6:
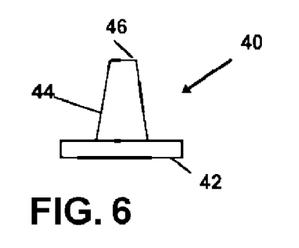
FIG. 6 shows a front view of an adapter for the device for engagement to the tailpipe of a vehicle.
Figure 7:
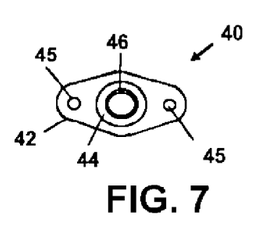
FIG. 7 shows a top view of the adapter.
Figure 8:
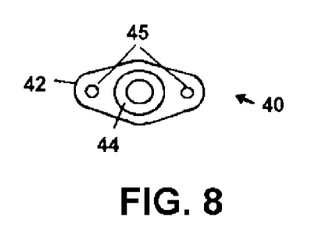
FIG. 8 shows a bottom view of the adapter.

In another particularly preferred mode of the present invention the device 10 may include an adapter 40 for operative sealed engagement to the tailpipe of a vehicle, providing there is sufficient heat. FIG. 6 shows a side view of the adapter 40 generally defined by a base 42 and frusto-conical or circumferentially tapering pipe portion 44 with a distal end 46. Top and bottom view can be seen in FIG. 7 and FIG. 8 respectively. The base 42 provides a means to engaged to the first end 13 of the intake pipe 12 of the device 10. Clearance holes 45 of the base 42 of the adapter 40 will generally coaxially align to the clearance holes 15 of the manifold first end 13 for bolt type engagement.

Figure 9:
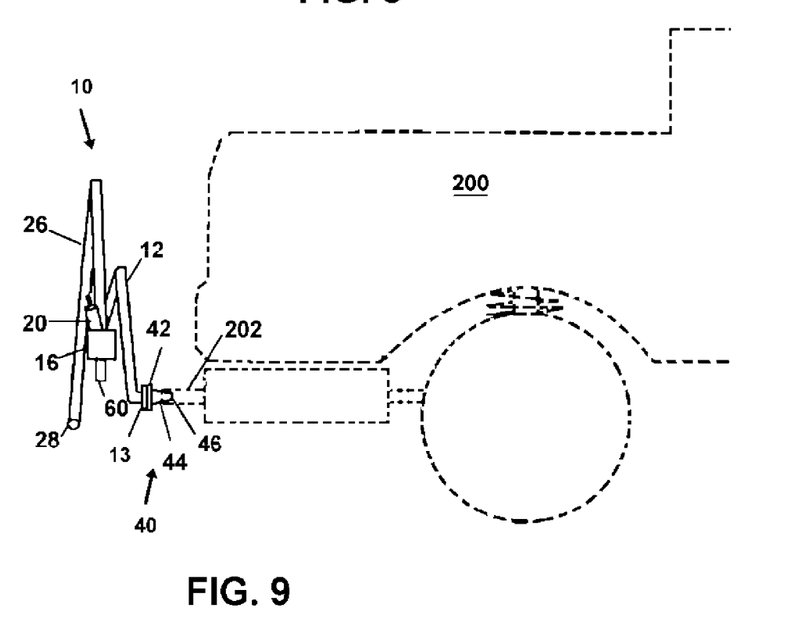
FIG. 9 is a side view of the device another particularly preferred mode employing the adapter for engagement to the tailpipe of a vehicle.

Shown in FIG. 9 is the as used mode of the device 10 employing the adapter 40. The distal end 46 of the frusto-conical pipe portion 44 is engaged into the terminating end of the tailpipe 202 of a vehicle 200 via frictional engagement. The frusto-conical portion 44 provides a means for biased frictional engagement to secure the device 10 in the as used mode as depicted into a tailpipe 202. The exhaust gasses pass through the adapter 40 and into the intake pipe 12 where preferred operation of the device 10 is employed as previously described. It must be noted that alternatively the adapter 40 can be permanently engaged to the intake pipe 12 of the device 10 such as by welding.

Figure 10:
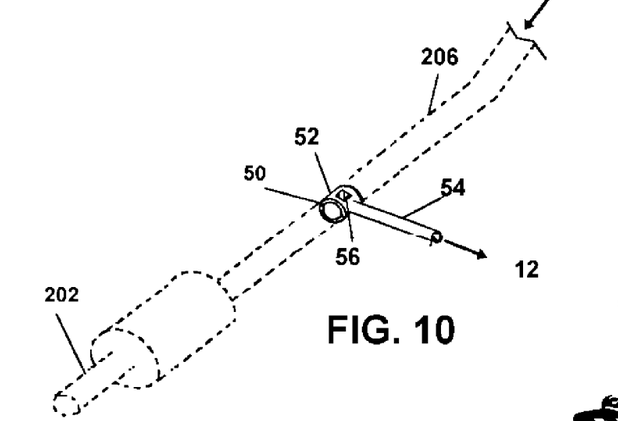
FIG. 10 is an elevated view of yet another particularly preferred mode of the device wherein an adaptive element is positioned at an intermediate location on a vehicle exhaust system.

In FIG. 10 is shown yet another particularly preferred mode the device 10 including an additional adaptive element 50 with an operative means of engagement to an intermediate position on a vehicle exhaust system 206 between the engine head 204 and tailpipe/muffler 202. The means of engagement can be permanent such as welding, or removable such as bolt type engagement. The adapter 50 in this mode includes a pipe body portion 52 that is positioned coaxially aligned with the conventional exhaust pipe 206 to allow exhaust gasses to flow normally.

Figure 10A:
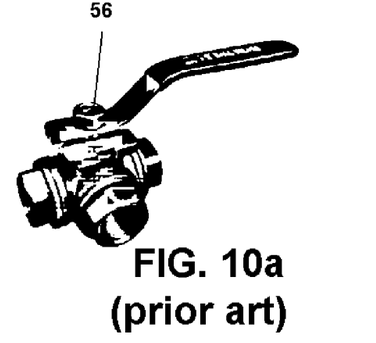
FIG. 10a shows a conventionally known three-way valve to be employed with the switch interface of the mode of the device of FIG. 10.

The adaptive element 50 further includes a switch interface to allow a user to switch the direction of flow of exhaust gasses to the secondary pipe 54 as desired, such as the provision of a three-way valve conventionally known in the art as shown in FIG. 10a. However, the switch interface 56 may be any pipe flow switch valve known in the art as desired within the intended scope of the switch interface 56 as set forth.

Figure 11:
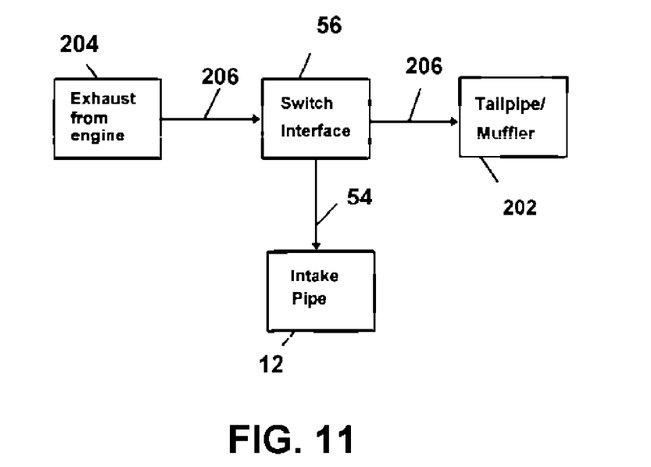
FIG. 11 is a schematic of the particularly preferred mode of the device of FIG. 10.

The secondary pipe 54 is operatively engaged to intake pipe 12 for directing exhaust gasses for operative employment of the device 10 as previously stated. In this mode the secondary pipe 54 may additionally employ the adapter 40 of FIG. 5 to engage the intake pipe 12 of the device 10 to the secondary pipe 54 via the frusto-conical portion 44. FIG. 11 shows a schematic of the preferred mode of the device 10 of FIG. 10.

Figure 12:
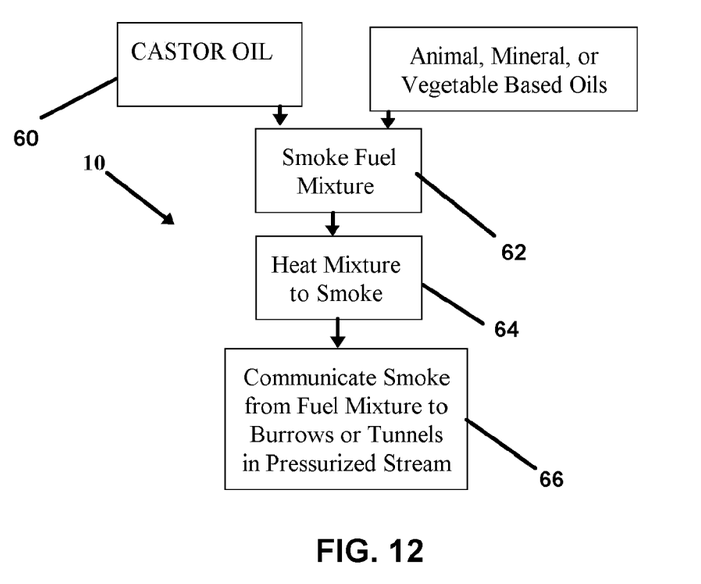
FIG. 12 depicts the process of forming the fuel mixture herein for generating smoke with long term deterrence for reoccupation.
Figure 13:
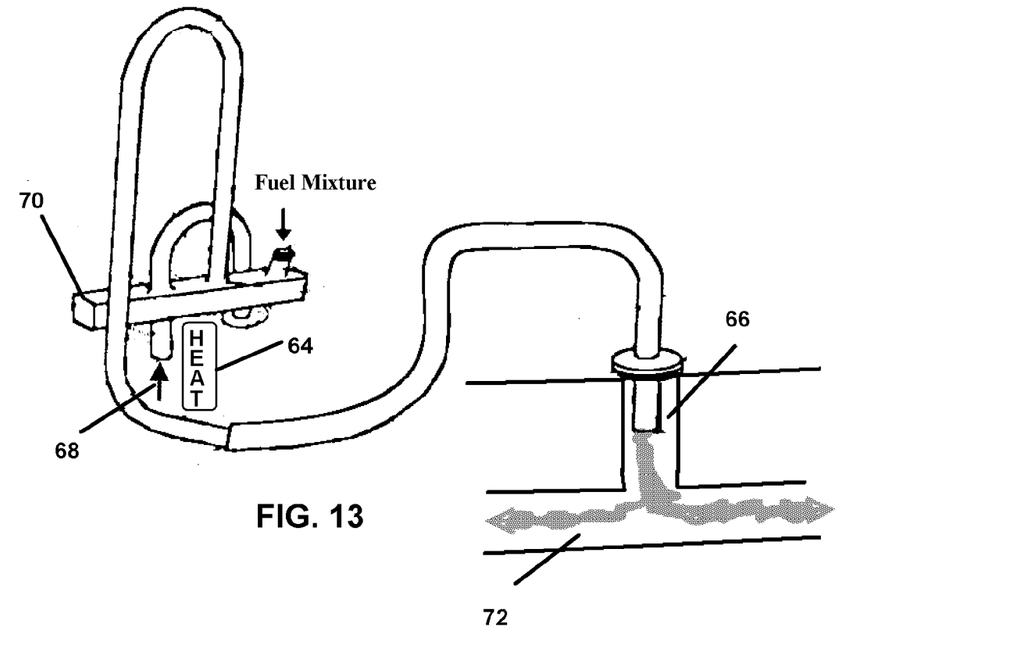
FIG. 13 is a depiction of heating of the liquid fuel mixture of FIG. 12, to a temperature and in an atmosphere to generate smoke, which is communicated to tunnels and burrows using a positive air pressure input such as from a fan or exhaust pipe.

Shown in FIGS. 12-13 is a graphic depiction of the method herein. In the method a smoke generating liquid which is either pure castor oil for extermination and subsequent residual deterrence, or, a mixture of castor oil in a combination with one or a plurality of secondary ingredients, from a group including mineral oil, safflower oil, and capsaicinoids is employed.

As noted, the liquid smoke fuel mixture, 60 a mixture of pure castor oil 60, or castor oil between 40 to 100 percent of the total volume of the smoke generating mixture 62 when mixed with other secondary ingredients used for developing the tunnel exterminating smoke. If not pure castor oil 60, a mixture of castor oil in a range of 40 to 100 percent of a total volume of the smoke generating mixture which also includes 10-60 percent mineral oil by volume, has shown to develop a toxic smoke, which also provides a significant enhancement of the long term deterrence of a reoccupation of the tunnel system subsequent to the extermination of the occupying vermin population.

Alternatively is has been found that mixture of castor oil in a range of 40 to 100 percent of a total volume of the smoke generating liquid mixture which also includes 10-60% safflower oil, or another vegetable oil by volume, also generates a smoke which will dispatch the rodent occupants of a tunnel system, and, impart a residue from the smoke with the deterrent odor attributed to the castor oil component of the mixture.

Additional residual deterrence and enhanced initial removal of rodents from fumigated tunnels has been found by adding *Oleoresin Capsicum* or capsaicinoids (the ingredient of pepper spray) to the secondary ingredients of the liquid mixture. Experimentation has shown the inclusion of capsaicinoids at a rate of from 0.18% to 1.33% of the total volume of the smoke generating liquid mixture provides a significant initial enhancement to removing pests from the tunnels. Further an enhanced long term deterrence from that simply using castor oil was found in experimentation with the differing mixtures. However in some cases inclusion of capsaicinoids might not be desirous as human residents of the property may be sensitive to the ingredient.

Consequently a mixture of pure castor oil for extermination and subsequent residual deterrence, or, castor oil combination with secondary ingredients from a group including mineral oil, safflower oil, vegetable oil and capsaicinoids, in the noted percentages of the total volume of smoke generating liquid mixture to increase the length of deterrence, are preferred.

In the method herein noted in FIG. 12, the mixture 62 noted herein providing the fuel for the smoke is heated 64 at a temperature to cause the mixture to generate smoke but not combust. The mixtures 62 herein may be heated over a resistive or flame style heater, and communicated using a pressurized airstream 68 which will cause the smoke generated in the reservoir 70 from the heat 64 communicated thereto, to flow into the tunnel system 72.

The pressurized airstream 68 may be provided by compressed air, a fan, may be provided by an exhaust stream from an internal combustion engine, which can also provided the heat source to the mixture 62 and a communication to the tunnels 72 of smoke from the smoke fuel mixture 62 and exhaust gases. Particularly favored as noted is the employment of the fuel mixture herein, in combination with the heat and exhaust of an internal combustion engine to provide both the heat to vaporize the mixture to smoke, and a heated moving airstream for communication of the mixture into vermin tunnels.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A method for generating and communicating a noxious airstream to underground tunnels of burrowing vermin, comprising:

placing a smoke generating fluid supply formed of at least castor oil into a reservoir;

mixing said smoke generating fluid supply to contain the castor oil at an amount between 40 to 100 percent of a total volume of the smoke generating fluid supply and mineral oil between 10 to 60 percent of the total volume of the smoke generating fluid supply;

communicating heat to the fluid supply to heat said fluid supply to a temperature at or above a smoking temperature, but below a combusting temperature for said fluid supply to generate smoke;

communicating a pressurized airstream through said reservoir to an exit at an exhaust port in communication with said reservoir;

communicating said pressurized airstream and said smoke carried thereby exiting said exit to said underground tunnels; and continuing communicating said pressurized airstream and said smoke to said underground tunnels to allow said smoke to impart residue therefrom to surfaces of said underground tunnels, whereby said burrowing vermin are removed from occupancy of said tunnels and said residue communicates a residual scent from said smoke to said tunnels as a long term deterrent from re-occupancy thereof.

2. The method of claim 1 additionally comprising the step of:

mixing said smoke generating fluid supply to contain capsaicinoids at a rate between 0.18% to 1.33% of the total volume of said smoke generating fluid supply.

3. The method of claim 1 additionally comprising the step of:

mixing said smoke generating fluid to contain said castor oil and mineral oil, in a combination with one or more secondary ingredients from a group consisting of safflower oil, vegetable oil and capsaicinoids.

4. A method for generating and communicating a noxious airstream to underground tunnels of burrowing vermin, comprising:

placing a smoke generating fluid supply formed of at least castor oil into a reservoir;

mixing said smoke generating fluid supply to contain the castor oil at an amount between 40 to 100 percent of a total volume of the smoke generating fluid supply and mineral oil between 10 to 60 percent of the total volume of the smoke generating fluid supply;

communicating heat to the fluid supply to heat said fluid supply to a temperature at or above a smoking temperature, but below a combusting temperature for said fluid supply to generate smoke;

employing exhaust gases exiting an internal combustion engine for communicating a pressurized airstream through said reservoir to an exit at an exhaust port in communication with said reservoir;

communicating said pressurized airstream and said smoke carried thereby exiting said exit to said underground tunnels;

continuing communicating said pressurized airstream and said smoke to said underground tunnels to allow said smoke to impart residue therefrom to surfaces of said underground tunnels, whereby said burrowing vermin are removed from occupancy of said tunnels and said residue communicates a residual scent from said smoke to said tunnels as a long term deterrent from re-occupancy thereof.

5. The method of claim 4 additionally comprising the step of:

mixing said smoke generating fluid supply to contain capsaicinoids at a rate between 0.18% to 1.33% of the total volume of said smoke generating fluid supply.

6. A method for generating and communicating a noxious airstream to underground tunnels of burrowing vermin, comprising:

placing a smoke generating fluid supply formed of at least castor oil into a reservoir;

mixing said smoke generating fluid supply to contain the castor oil at an amount between 40 to 100 percent of a total volume of the smoke generating fluid supply and mineral oil between 10 to 60 percent of the total volume of the smoke generating fluid supply;

communicating heat to the fluid supply to heat said fluid supply to a temperature at or above a smoking temperature, but below a combusting temperature for said fluid supply to generate smoke;

employing exhaust gases exiting an internal combustion engine for communicating a pressurized airstream through said reservoir to an exit at an exhaust port in communication with said reservoir;

employing said exhaust gases to communicate said heat to said fluid supply;

communicating said pressurized airstream and said smoke carried thereby exiting said exit to said underground tunnels;

continuing communicating said pressurized airstream and said smoke to said underground tunnels to allow said smoke to impart residue therefrom to surfaces of said underground tunnels, whereby said burrowing vermin are removed from occupancy of said tunnels and said residue communicates a residual scent from said smoke to said tunnels as a long term deterrent from re-occupancy thereof.

7. The method of claim 6 additionally comprising the step of:

mixing said smoke generating fluid supply to contain capsaicnoids at a rate between 0.18% to 1.33% of the total volume of said smoke generating fluid supply.

\* \* \* \* \*